2,894,991

FLUOROALKYL SULFUR COMPOUNDS

John T. Barr, Needham, Mass., and Francis E. Lawlor, Wyndmoor, Pa., assignors to Pennsalt Chemicals Corporation, a corporation of Pennsylvania No Drawing. Application December 10, 1956
Serial No. 627,152

19 Claims. (Cl. 260—608)

This invention relates to novel fluoroalkyl sulfur compounds and to their preparation. Particularly it relates to bis(2,2,2-trifluoroethyl) sulfides and to 2,2,2-trifluoroethyl mercaptan.

The new compositions of matter of our invention are fluoroalkyl sulfur compounds having the structural formula $R_fCH_2S_xY$ in which Y is hydrogen or $R_f'CH_2$; $R_f$ and $R_f'$ are each a perfluoroalkyl group with 1 to 6 carbon atoms; $x$ is 1 when Y is hydrogen; and $x$ is at least 1 when Y is $R_f'CH_2$. $R_f$ and $R_f'$ may be identical or different perfluoroalkyl groups containing from 1 to 6 carbon atoms. 1,1-dihydroperfluoroalkyl mercaptans, in which $x$ is 1, and bis(1,1-dihydroperfluoroalkyl) sulfides in which $x$ is 1 to 3 are the preferred compounds of our invention; however, in the case of the sulfides, $x$ may be more than 3 because of the known tendency of sulfur to form polysulfides.

Representative compounds of our invention are $CF_3CH_2SH$; $(CF_3CH_2)_2S$; $(CF_3CH_2)_2S_2$; $(CF_3CH_2)_2S_3$;
$CF_3CF_2CH_2SH$; $(CF_3CF_2CH_2)_2S$; $(CF_3CF_2CH_2)_2S_2$;
$(CF_3CF_2CH_2)_2S_3$; $CF_3CF_2CF_2CH_2SH$;
$(CF_3CF_2CF_2CH_2)_2S$; $(CF_3CF_2CF_2CH_2)_2S_2$;
$(CF_3CF_2CF_2CH_2)_2S_3$; $CF_3CF_2CH_2SCH_2CF_3$;
$CF_3CF_2CF_2CH_2SCH_2CF_3$; $CF_3CF_2CH_2S$—$SCH_2CF_3$;
$CF_3CF_2CF_2CH_2S$—$S$—$SCH_2CF_3$
$CF_3CF_2CF_2CF_2CH_2SH$; $(CF_3CF_2CF_2CH_2)_2S$;
$(CF_3CF_2CF_2CH_2)_2S_2$; $(CF_3CF_2CF_2CF_2CH_2)_2S_3$;
$CF_3CF_2CF_2CF_2CF_2CH_2SH$; $(CF_3CF_2CF_2CF_2CF_2CH_2)_2S$;
$CF_3CF_2CF_2CF_2CF_2CF_2CH_2SH$;
$(CF_3CF_2CF_2CF_2CF_2CF_2CH_2)_2S$;
$(CF_3CF_2CF_2CF_2CF_2CF_2CH_2)_2S_2$; and
$(CF_3CF_2CF_2CF_2CF_2CF_2CH_2)_2S_3$.

Our novel fluoroalkyl sulfur rompounds are derived from compounds containing chemically reactive bivalent sulfur, preferably the inorganic sulfur compounds, and the p-toluenesulfonic acid ester of a 1,1-dihydroperfluoroalkanol having from 2 to 7 carbon atoms. Said p-toluenesulfonic acid ester of a 1,1-dihydroperfluoroalkanol will hereafter be referred to as a 1,1-dihydroperfluoroalkyl tosylate. The 1,1-dihydroperfluoroalkyl tosylates are readily formed, using methods known in the art, by reacting, for example, a 1,1-dihydroperfluoroalkanol having the formula $R_fCH_2OH$, in which $R_f$ is perfluoroalkyl with 1 to 6 carbon atoms, with p-toluenesulfonyl chloride to form a tosylate having the formula $CH_3C_6H_4SO_3CH_2R_f$. Thus, 2,2,2-trifluoroethanol is reacted with p-toluenesulfonyl chloride to form 2,2,2-trifluoroethyl tosylate, $CH_3C_6H_4SO_3CH_2CF_3$.

Inorganic sulfur compounds which have been found useful in carrying out our invention include alkali metal sulfides, e.g., $Na_2S$ and $Na_2S_x$; alkali metal thiosulfates, e.g., $Na_2S_2O_3$; and sulfides formed in situ, as for example by reacting hydrogen sulfide with an alkali hydroxide, e.g., KOH. In an advantageous procedure in practicing our invention anhydrous alkali metal sulfide is prepared by reaction of an alkali metal alcoholate with $H_2S$, followed by removal of the alcohol.

The novel compounds of our invention and preferred methods for their preparation, can be better understood by describing, for the purposes of illustration, our invention in connection with the use of 2,2,2-trifluoroethyl tosylate for the preparation of 2,2,2-trifluoroethyl sulfur compounds, specifically 2,2,2-trifluoroethyl mercaptan, bis(2,2,2-trifluoroethyl) sulfide, bis(2,2,2-trifluoroethyl) disulfide, and bis(2,2,2-trifluoroethyl) trisulfide.

In general, 2,2,2-trifluoroethyl mercaptan is made by reacting 2,2,2-trifluoroethyl tosylate in an organic solvent with an alkali metal sulfide or bisulfide. Some bis(2,2,2-trifluoroethyl) sulfide is also simultaneously formed. When an alkali metal thiosulfate is used in the presence of a polar organic solvent, bis(2,2,2-trifluoroethyl) disulfide and bis(2,2,2-trifluoroethyl) trisulfide are formed. Also, upon further reacting said disulfide or trisulfide with a hydrogenating agent 2,2,2-trifluoroethyl mercaptan is formed.

The reactions of our invention are preferably carried out in the presence of a polar organic solvent. Polar organic solvents which we have found useful, include, for example, methanol, ethanol, propanol, isopropanol, dimethyl formamide and diethylene glycol. Dimethyl formamide is the preferred solvent when an alkali metal sulfide is used as the sulfiding agent. Sodium thiosulfate or a mixture of an alkali metal hydroxide with hydrogen sulfide may also be used as a preferred sulfiding agent in dimethyl formamide. Use of sodium thiosulfate in the presence of a high boiling solvent such as diethylene glycol has been found to favor the formation of the bis (2,2,2-trifluoroethyl) polysulfides.

The reactions of our invention are preferably carried out at a temperature in the range from about 65 to 200° C. With the lower boiling solvents, such as propanol, the reaction is carried out at reflux temperature. When a higher boiling solvent, such as diethylene glycol, is used, a temperature around 125–150° C. is preferred. Our reactions may also be carried out under pressure in an autoclave within the temperature range indicated above.

Formation of 2,2,2-trifluoroethyl mercaptan from a bis (2,2,2-trifluoroethyl) di- or trisulfide of the group described above may also be achieved by hydrogenation of one or more of said bis(trifluoroethyl) sulfides with hydrogenation agents, according to procedures known in the art. For example, zinc dust and hydrochloric acid in aqueous solution may be used as the hydrogenating agent. The reaction is carried out at the refluxing temperature of the reaction mass.

The process of our invention is further disclosed by the following examples. Parts are by weight unless otherwise stated.

EXAMPLE 1

*Preparation of bis(2,2,2-trifluoroethyl) sulfide*

A solution of 22.5 parts of potassium hydroxide in about 150 parts of normal propanol was saturated with hydrogen sulfide and then refluxed with 102 parts of 2,2,2-trifluoroethyl tosylate. The mixture was next distilled to a vapor temperature of 90° C. The distillate was washed with water, dried and redistilled. A yield of 18.2 parts of bis(2,2,2-trifluoroethyl) sulfide was obtained. The product boiled at 82–86° C. Its refractive index was $n_d^{27}$ 1.3370. Its density was 1.25 g./ml.

EXAMPLE 2

Preparation of bis(2,2,2-trifluoroethyl) sulfide 54 grams of sodium methylate in 100 ml. of methanol were saturated with $H_2S$, forming NaHS. Another 54 grams of sodium methylate were added to the mixture, resulting in the formation of $Na_2S$. The alcohol was evaporated from the mixture. The residue was dissolved in 1 liter of dimethyl formamide. 254 grams of $$CH_3C_6H_4OSO_2CH_2CF_3$$

were added. The mass was heated slowly to 100° C. during a 3 hour period, and was reacted at that temperature for 3 hours more. The reaction mass was then distilled. A middle fraction of 90 ml. of a mixture of crude product and solvent boiling in the range 50–70° C., was recovered. This fraction was washed with water to remove the solvent, and was redistilled. 47 grams of $(CF_3CH_2)_2S$, boiling at about 86° C., were recovered.

EXAMPLE 3

Preparation of bis(2,2,2-trifluoroethyl) polysulfides 102 parts of 2,2,2-trifluoroethyl tosylate and 95 parts of sodium thiosulfate were mixed with about 200 parts of diethylene glycol. The mixture was heated for 4 hours at 125–160° C. It was then cooled, and about 125 parts of 12 N sulfuric acid were added. The mixture was refluxed for 2 additional hours. The mixture was next steam-distilled and 625 parts of distillate, containing the product, were recovered. The yellow organic layer of the distillate was separated from the water layer, dried and distilled. The products recovered consisted of 6 parts of $(CF_3CH_2)_2S_2$, B.P. 130–180° C., 4 parts of $(CF_3CH_2)_2S_3$, B.P. 180°–200° C., and 20 parts of residue.

EXAMPLE 4

Preparation of 2,2,2-trifluoroethyl mercaptan 10 parts of organic product layer of the steam distillate of Example 3, comprising $(CF_3CH_2)_2S_2$ and $(CF_3CH_2)_2S_3$, were mixed with about 10 parts of zinc dust and about 10 parts of water and stirred under reflux. About 25 parts of concentrated hydrochloric acid in about 10 parts of water were added slowly during the refluxing. The mixture was then distilled. Seven parts of 2,2,2-trifluoroethyl mercaptan, $CF_3CH_2SH$, were recovered. The product boiled at 34–35° C. Its refractive index was $n_d^{26}$ 1.3426.

EXAMPLE 5

Preparation of 2,2,2-trifluoroethyl mercaptan and bis-(2,2,2-trifluoroethyl) disulfide 260 parts of 2,2,2-trifluoroethyl tosylate and 78 parts of partially dehydrated $Na_2S$ were reacted in 150 parts of dimethyl formamide at about 115° C. for about 3 hours. Yields of 12 parts of $CF_3CH_2SH$ and 10 parts of $(CF_3CH_2)_2S$ were recovered.

Bis(2,2,2-trifluoroethyl) disulfide, and bis(2,2,2-trifluoroethyl) trisulfide are each useful chemical interemediates for the preparation of 2,2,2-trifluoroethyl mercaptan as has been shown in Example 4. All the new compounds of our invention are odoriferous materials useful as odorants for fuel gas. The 2,2,2-trifluoroethyl mercaptan is particularly useful for such purpose, as shown by Example 6.

EXAMPLE 6

The activity of 2,2,2-trifluoroethyl mercaptan as a fuel gas odorant is shown in Table 1. 2,2,2-trifluoroethyl mercaptan was tested by an odor rank method whereby its activity as an odorant was compared against that of a proprietary fuel gas odorant comprising a mixture of lower alkyl mercaptans. The intensity-concentration rating of 2,2,2-trifluoroethyl mercaptan compared favorably.

TABLE I

| Odorant concentration (arbitrary units) | Standard | $CF_3CH_2SH$ |
|---|---|---|
| .01 | .19 | .13 |
| .02 | .50 | .38 |
| .04 | .88 | .94 |
| .05 | 1.25 | .94 |
| .07 | 1.31 | 1.13 |
| .10 | 1.38 | 1.50 |
| .15 | 1.75 | 1.50 |

Usefulness of our fluoroalkyl sulfur compounds as soil fumigants is demonstrated by Example 7.

EXAMPLE 7

The nematocidal activity of bis(2,2,2-trifluoroethyl) sulfide as a soil fumigant is shown by the following test and results.

A quart jar was filled with sand. A hole was made through the sand to the bottom of the jar. A predetermined dose of bis(2,2,2-trifluoroethyl) sulfide was dropped to the bottom of the jar. The sand was then closed over the test material and the hole filled. An open vial containing about 7 ml. of sand saturated with a saprophytic nematode (*Panagrellus reclivivis*) was placed on the top of the sand layer in the jar. The jar then was closed.

The effectiveness of the test material is dependent on its ability to pass through the sand from the bottom of the jar to sand at the top to kill the nematode. The kill was determined by microscopic examination of the sand in the vial after the test period. As shown by the data in Table 2, bis(2,2,2-trifluoroethyl) sulfide was 100% effective as a nematocide in a 24 hour period at a dosage of 0.5 ml.

TABLE 2

| Test No. | Dosage ml. | Percent kill |
|---|---|---|
| Check | 0 | 0 |
| 1 | 0.1 | 30 |
| 2 | 0.5 | 100 |

We have described our invention by using 2,2,2-trifluoroethyl tosylate as a starting material for the preparation of species of the compounds of our invention. It will be apparent to those skilled in the art that other species of our novel and useful compounds can likewise readily be prepared. For example, other 1,1-dihydroperfluoroalkanols besides 2,2,2-trifluoroethanol can readily be reacted with p-toluenesulfonyl chloride to form the corresponding tosylate. 1,1-dihydroperfluoroalkanols useful for the reaction are 1,1-dihydroperfluoropropanol; 1,1,-dihydroperfluorobutanol; 1,1-dihydroperfluoropentanol; 1,1-dihydroperfluorohexanol; and 1,1-dihydroperfluoroheptanol. Each of the 1,1-dihydrofluoroalkyl tosylates may then be reacted by the process of our invention with sulfur compounds containing chemically reactive bivalent sulfur to form the corresponding mercaptans and sulfides.

The term "hydrogen" as used in the claims includes nascent hydrogen formed in situ by the action of a metal on a nonoxidizing acid.

Furthermore, sulfides containing mixed 1,1-dihydroperfluoroalkyl groups may be made by reacting a 1,1-dihydroperfluoroalkyl mercaptan in the presence of an alkali with a 1,1-dihydroperfluoroalkyl tosylate in which the alkyl group is different in the mercaptan from that in the tosylate. For example, $CF_3CH_2SH$ may be reacted by the process of our invention with $CH_3C_6H_4OSO_2CH_2CF_2CF_3$ to make $$CF_3CH_2SCH_2CF_2CF_3$$

Many different embodiments of this invention may be made without departing from the scope and spirit of it, and it is to be understood that our invention includes also such embodiments and is not to be limited by the above description.

We claim:
1. A compound having the formula $R_fCH_2S_xY$ in which Y is selected from the group consisting of hydrogen and $R_f'CH_2$; $R_f$ and $R_f'$ are each a perfluoroalkyl group with from 1 to 6 carbon atoms; $x$ is 1 when Y is hydrogen; and $x$ is a small integer when Y is $R_f'CH_2$.
2. A compound according to claim 1 in which $x$ is 1 and Y is $R_f'CH_2$.
3. A compound according to claim 1 in which $x$ is 2 and Y is $R_f'CH_2$.
4. A compound according to claim 1 in which $x$ is 3 and Y is $R_f'CH_2$.
5. A compound according to claim 1 in which Y is hydrogen.
6. A compound having the formula $CF_3CH_2S_xY$ in which Y is selected from the group consisting of hydrogen and $CF_3CH_2$; $x$ is 1 when Y is hydrogen; and $x$ is a small integer when Y is $CF_3CH_2$.
7. $CF_3CH_2SH$.
8. $(CF_3CH_2)_2S$.
9. $(CF_3CH_2)_2S_2$.
10. $(CF_3CH_2)_2S_3$.
11. The method for the preparation of a compound having the formula $R_fCH_2S_xY$ as defined in claim 1 which comprises reacting a 1,1-dihydroperfluoroalkyl tosylate having the formula $C_6H_4CH_3SO_3CH_2R_f$ in which $R_f$ is a perfluoroalkyl group with 1 to 6 carbon atoms with an inorganic sulfur compound selected from the group consisting of alkali metal sulfides and alkali metal thiosulfates.
12. The method of claim 11 carried out in a polar organic solvent.
13. The method for the preparation of a compound having the formula $CF_3CH_2S_xY$ as defined in claim 6 which comprises reacting 2,2,2-trifluoroethyl tosylate with an inorganic sulfur compound selected from the group consisting of alkali metal sulfides and alkali metal thiosulfates.
14. The method according to claim 13 carried out in a polar solvent.
15. The method for the preparation of a bis(2,2,2-trifluoroethyl) sulfide having the structural formula $(CF_3CH_2)_2S_x$ in which $x$ is a small integer which comprises reacting 2,2,2-trifluoroethyl tosylate with an inorganic sulfur compound selected from the group consisting of alkali metal sulfides and alkali metal thiosulfates.
16. The method for the preparation of 2,2,2-trifluoroethyl mercaptan which comprises reacting the p-toluenesulfonic acid ester of 2,2,2-trifluoroethanol with an inorganic sulfur compound selected from the group consisting of alkali metal sulfides and alkali metal thiosulfates to form a 2,2,2-trifluoroethyl polysulfide having the structural formula $(CF_3CH_2)_2S_x$ in which $x$ is a small integer and further reacting said polysulfide with hydrogen to form 2,2,2-trifluoroethyl mercaptan.
17. The method for the preparation of 2,2,2-trifluoroethyl mercaptan which comprises reacting a bis(2,2,2-trifluoroethyl) polysulfide having the structural formula $(CF_3CH_2)_2S_x$ in which $x$ is a small integer with a hydrogen in acid media in the temperature range from about 25° C. to the refluxing temperature of the reaction mass and recovering 2,2,2-trifluoroethyl mercaptan from said mass.
18. The method for the preparation of bis(2,2,2-trifluoroethyl) sulfide which comprises reacting 2,2,2-trifluoroethyl tosylate with an alcoholic mixture of an inorganic sulfur compound selected from the group consisting of alkali metal sulfides and alkali metal thiosulfates by heating said reactants at a temperature of from 65° C. to the refluxing temperature of the reaction mass for from 5 to 24 hours, and recovering bis(2,2,2-trifluoroethyl) sulfide from the reaction mass.
19. The method for the preparation of a bis(2,2,2-trifluoroethyl) polysulfide having the structural formula $(CF_3CH_2)_2S_x$ in which $x$ is a small integer which comprises reacting the 2,2,2-trifluoroethyl tosylate with an alkali metal thiosulfate in a polar organic solvent having a boiling point above 100° C. in the temperature range from about 65° C. to refluxing temperature for from 2 to 24 hours, acidifying with a mineral acid, refluxing the mixture additionally for about from 1 to 4 hours, and recovering said bis(2,2,2-trifluoroethyl) polysulfide from the reaction mass.

No references cited.